UNITED STATES PATENT OFFICE.

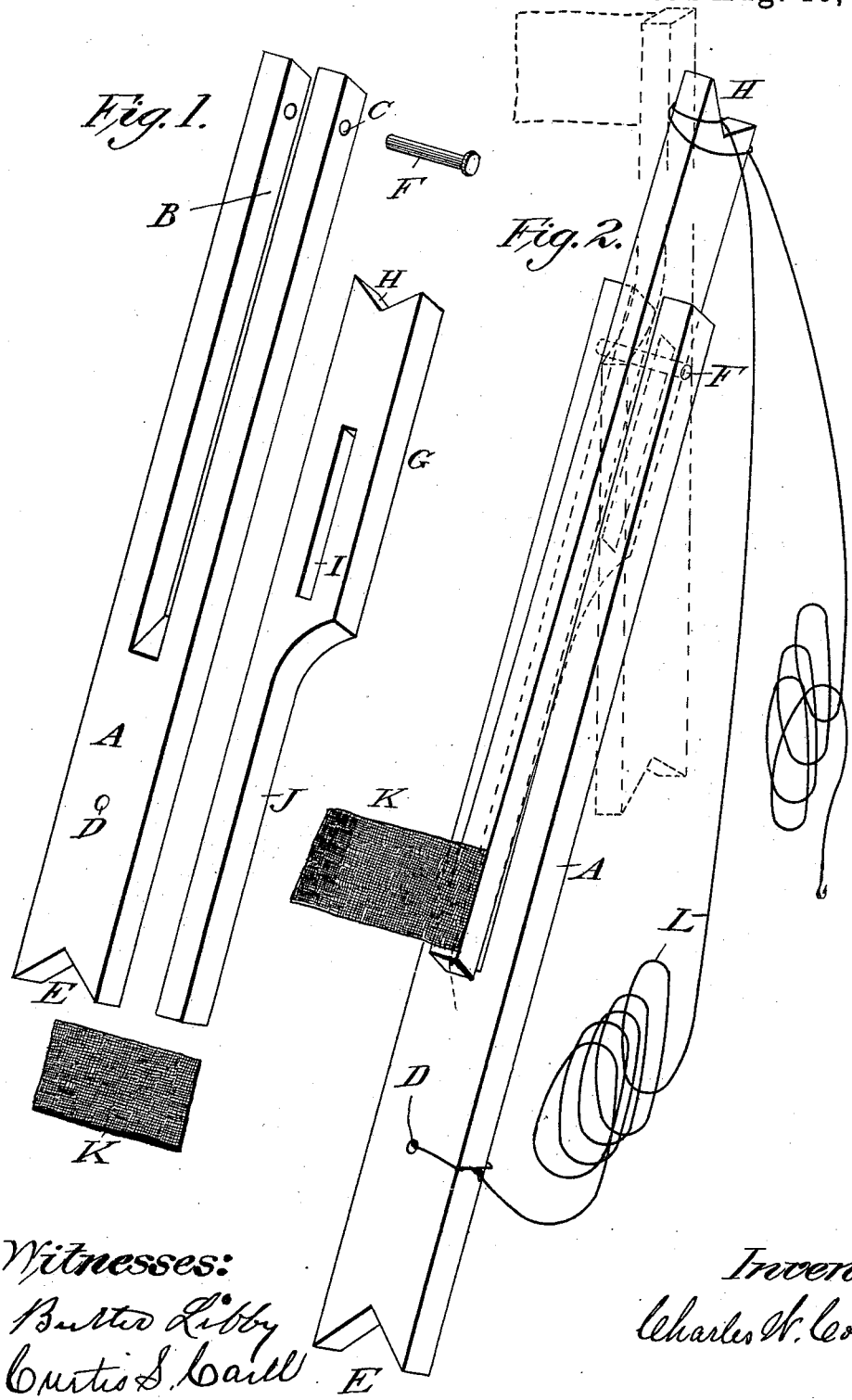

CHARLES WESLEY COSTELLOW, OF WATERBOROUGH, MAINE.

TIP-UP FOR FISHING.

SPECIFICATION forming part of Letters Patent No. 434,426, dated August 19, 1890.

Application filed November 23, 1889. Serial No. 331,396. (Model.)

*To all whom it may concern:*

Be it known that I, CHARLES WESLEY COSTELLOW, a citizen of the United States, residing at Waterborough, in the county of York and State of Maine, have invented certain new and useful Improvements in a Tip-Up or Tackle for Fishing; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a tackle for catching fish which shall be simpler in construction, cheaper, more durable, and easier operated and more effective than appliances now used for the purpose. The general object of appliances of this kind is to enable one or two persons to set and successfully care for twenty-five or fifty (more or less) lines at one time, and thus catch a proportionately greater number of fish.

The nature of my invention will be described below and pointed out in the claim.

In the drawings, Figure 1 represents the separate parts of my tip-up. Fig. 2 shows the tip-up complete.

Similar letters refer to similar parts in both figures.

A is a standard, having a notch E in the lower end, a small hole D, a long slot B, and a small hole C, into which fits the fulcrum-pin F.

G is a tipping flag-staff, having a notch H, a slot I, and having one end reduced, as at J.

K is a flag of bright cloth or other material.

To put the tip-up together, the piece G is placed in the slot B, and the pin F is driven into the hole C, passing through the slot I. The flag K is nailed or otherwise secured to the end of the piece G. One end of the line L is passed through the hole D and secured. A hook is secured at the other end of the line L, all substantially as shown in Fig. 2.

To operate this tip-up, a hole is first cut through the ice large enough to pull out the fish when caught, and as near to it as may be cut a smaller hole, just large and deep enough to receive the lower end of the standard A, which should slant from perpendicular just enough so that the notch H will be directly over the hole through the ice. The flag end of the tipping-piece G being down, enough of the line is taken so that when straight the hook and bait will hang at the proper depth, and the line is set by taking one turn around the horn and one turn around the whole piece G, as shown at H, Fig. 2. Bait the hook and allow it to hang in the water. When a fish bites, it will pull down on the line, taking with it the end H and throwing up the flag, the piece G at the same time falling the length of the slot I, as shown by dotted lines in Fig. 2. At the same time the line at H drops off, giving the fish all the slack line to run on, during which time the fish will hook itself and the fisherman will have notice by the upright flag that there is a fish hooked.

The piece G should work easily in the slot B and also on the fulcrum-pin F, and be so balanced that the center of gravity of the piece G will be about half-way between the ends of the slot I. Thus the flag K will always be when at rest either at the highest or the lowest point.

The object of having the piece G reduced, as at J, is to lighten this end that it may be made longer from the slot I. Thus the flag K will have a greater distance between the extreme up and down points than it would have if the piece G were even size the whole length.

The object of the notches E and H in combination is that the line may be wound lengthwise of the tip-up in them when not in use.

Although this tip-up is used principally for winter fishing, it is equally well adapted to summer fishing, the only necessary modification being to provide a plank float or other means of support for the standard A.

Having thus described my invention, what I claim, and desire to secure by Letters Patent, is—

A tip-up or tackle for fishing, consisting of a forked standard, a slotted bar loosely pivoted therein and having one end reduced, and a signaling device secured thereto, and depressions at the extremities of both standard and bar for reeling the fishing-line, substantially as described.

CHARLES WESLEY COSTELLOW.

Witnesses:
CURTIS S. CARLL,
GEORGE W. CARLL.